United States Patent [19]
Gerdes et al.

[11] Patent Number: 6,045,066
[45] Date of Patent: Apr. 4, 2000

[54] CORNER IRRIGATION SYSTEM

[75] Inventors: Jerry D. Gerdes; Rudy R. Unruh, both of Omaha, Nebr.

[73] Assignee: Valmont Industries, Inc., Valley, Nebr.

[21] Appl. No.: 09/164,326

[22] Filed: Oct. 1, 1998

[51] Int. Cl.[7] .................................................... B05B 3/12
[52] U.S. Cl. .............................. 239/729; 239/69; 239/97; 239/DIG. 15; 364/142
[58] Field of Search ................................. 239/69, 71, 73, 239/DIG. 1, 726, 728, 729, 730, 731, 732, 733, 743, 744, DIG. 15, 66, 97; 364/142; 700/3, 284

[56] References Cited

U.S. PATENT DOCUMENTS

| | | | |
|---|---|---|---|
| 3,802,627 | 4/1974 | Seckler | 239/729 |
| 3,902,668 | 9/1975 | Daugherty et al. | 239/177 |
| 4,161,292 | 7/1979 | Holloway et al. | 239/11 |
| 4,186,880 | 2/1980 | Jacobi et al. | 239/729 |
| 4,227,648 | 10/1980 | Holloway et al. | 239/11 |
| 4,249,698 | 2/1981 | Smith et al. | 239/729 X |
| 4,340,183 | 7/1982 | Kegel et al. | 239/729 |
| 4,508,269 | 4/1985 | Davis et al. | 239/729 |
| 4,674,681 | 6/1987 | Meis et al. | 239/729 X |
| 4,729,514 | 3/1988 | Ostrom et al. | 239/727 |
| 5,246,164 | 9/1993 | McCann et al. | 239/73 X |
| 5,341,995 | 8/1994 | Leatch | 239/729 |
| 5,435,495 | 7/1995 | Davis | 239/728 |
| 5,678,771 | 10/1997 | Chapman | 239/727 |

*Primary Examiner*—Lesley D. Morris
*Assistant Examiner*—Steven J. Ganey
*Attorney, Agent, or Firm*—Zarley, McKee, Thomte Voorhees & Sease; Dennis L. Thomte

[57] ABSTRACT

An irrigation system is disclosed which includes a center pivot support having an elongated main water boom pivotally connected thereto which extends outwardly therefrom. An elongated extension boom is pivotally connected at its inner end to the outer end of the main boom and is supported by a steerable drive tower. A corner arm sensor is provided for sensing the angle of the extension boom with respect to the main boom. A plurality of sprinklers are positioned on the extension boom along the length thereof and are controlled by a computer which is programmed with a table of sprinkler sequences. The computer calculates the areas being covered by the extension boom as the system is moved through the field and determines the best sprinkler sequence for the sprinkler on the extension boom.

4 Claims, 10 Drawing Sheets

FIG. I

CORNER IRRIGATION SYSTEM

BACKGROUND OF THE INVENTION

1. Field of the Invention

This invention relates to a center pivot irrigation system having the ability to irrigate the corners of the field being irrigated. More particularly, this invention relates to an improved means for controlling the distribution of water from the corner span.

2. Description of the Related Art

Conventional center pivot irrigation systems comprise an elongated main boom pivotally connected at its inner end to a center pivot structure and extending outwardly therefrom. The main boom of the conventional center pivot irrigation system is comprised of a plurality of pipes connected together in an end-to-end fashion and which are supported upon a plurality of drive towers. In most conventional center pivot irrigation systems, the outermost drive tower is the master tower with the other drive towers being selectively driven in response to angular displacement of the boom section adjacent thereto.

In the early 1970s, corner systems for center pivot irrigation systems were developed to enable the corners of a square field to be irrigated. See, for example, U.S. Pat. Nos. 3,797,517; 3,802,726; and 3,902,668. Corner systems usually consist of an extension boom or arm, sometimes referred to as a corner span, which is pivotally connected to the outer end of the main boom and which is supported on at least one steerable drive tower. A guidance system is provided for guiding or steering the extension tower, and extension boom, out into the corners of the field as the main arm travels around the field. Perhaps the most popular method of guiding the extension tower is the buried wire system described in U.S. Pat. No. 3,902,668.

A plurality of spaced-apart sprinklers are provided on the main boom as well as on the extension boom. The sprinklers on the extension boom are not activated until the extension boom moves out into the corners of the field. A difficulty arises in providing uniform water distribution in the corner areas of the field due to the fact that the sprinklers on the extension boom cover varying areas of the field as the extension boom moves out into the corner of the field and when the extension arm is retracting from its fully extended position.

Heretofore, groups of sprinklers on the extension boom were switched on or off, depending upon the angle the extension boom made with the main boom. This resulted in some overwatering and some underwatering, depending upon the relative position of the extension boom.

SUMMARY OF THE INVENTION

A center pivot irrigation system with a corner span attachment is described herein which includes a center pivot support structure located in the field to be irrigated. An elongated main water boom, having inner and outer ends, is pivoted at its inner end to the center pivot support structure and extends outwardly therefrom. The main water boom is comprised of an elongated main water pipe supported upon a plurality of non-steerable drive towers which propel the main water pipe around the center pivot support structure. An elongated extension boom, having inner and outer ends, is pivotally connected at its inner end to the outer end of the main boom with the extension boom comprising an elongated extension water pipe supported upon at least one steerable drive tower.

A plurality of spaced-apart sprinklers are provided on the main boom for irrigating the field beneath the main boom and a plurality of spaced-apart sprinklers are provided on the extension boom which are controlled by a sequencing means.

A computer is provided which is programmed with a table of sprinkler sequences and the length of the extension boom. An angle sensing means is also provided for sensing the angle of the extension boom with respect to the main boom. The computer calculates the area covered by the extension boom by using the corner angle, the length of the extension boom, and the change in the corner angle. By comparing the areas to the table of sprinkler sequences, the computer selects the best available sprinkler sequence for all corner positions.

It is therefore a principal object of the invention to provide an improved means for irrigating the corner areas of a field, where overwatering and underwatering are eliminated.

A further object of the invention is to provide a means for sensing the areas being covered by the corner span and for controlling the sprinklers on the corner span in relation thereto.

These and other objects will be apparent to those skilled in the art.

BRIEF DESCRIPTION OF THE DRAWINGS

FIG. 5, 6, 7, 8, and 9 illustrate the manner in which the areas are calculated.

DESCRIPTION OF THE PREFERRED EMBODIMENT

Figure 1:
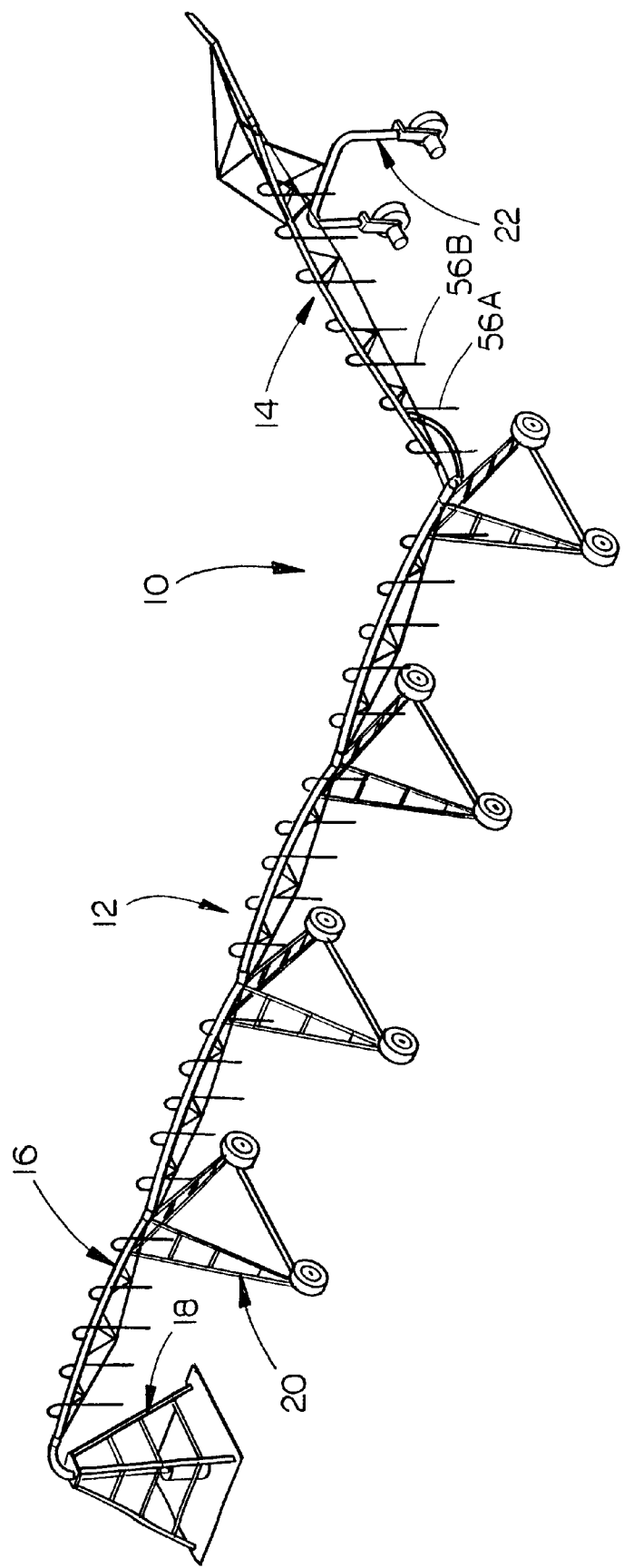
FIG. 1 is a perspective view of a center pivot irrigation system having a corner span pivotally mounted to the outer end thereof.

The numeral 10 refers generally to a self-propelled irrigation system which is comprised of a center pivot irrigation system 12 having a corner arm irrigation system or extension boom 14 pivotally connected to the outer end thereof. Generally speaking, center pivot irrigation system 12 is of conventional design and includes a main water conduit or boom 16 which extends outwardly from a conventional center pivot structure 18. Main boom 16 is supported by a plurality of drive towers 20 in conventional fashion. The drive towers 20 are designed to propel the center pivot system around the center pivot structure 18 in conventional fashion. Corner arm, corner span, corner boom or extension boom 14 is supported upon a steerable drive tower 22.

Figure 2:
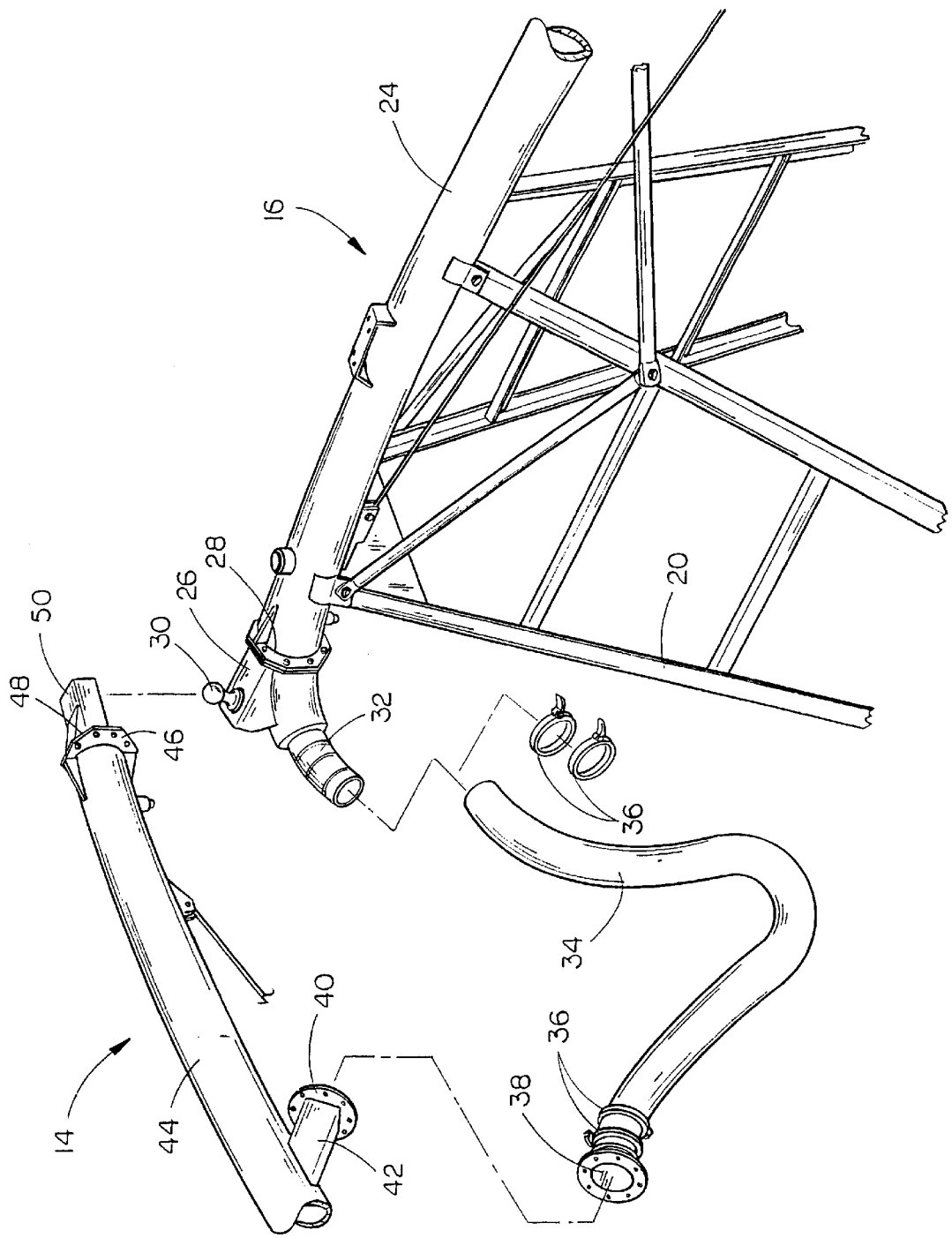
FIG. 2 is an exploded perspective view of the connection between the main boom and extension boom.
Figure 3:
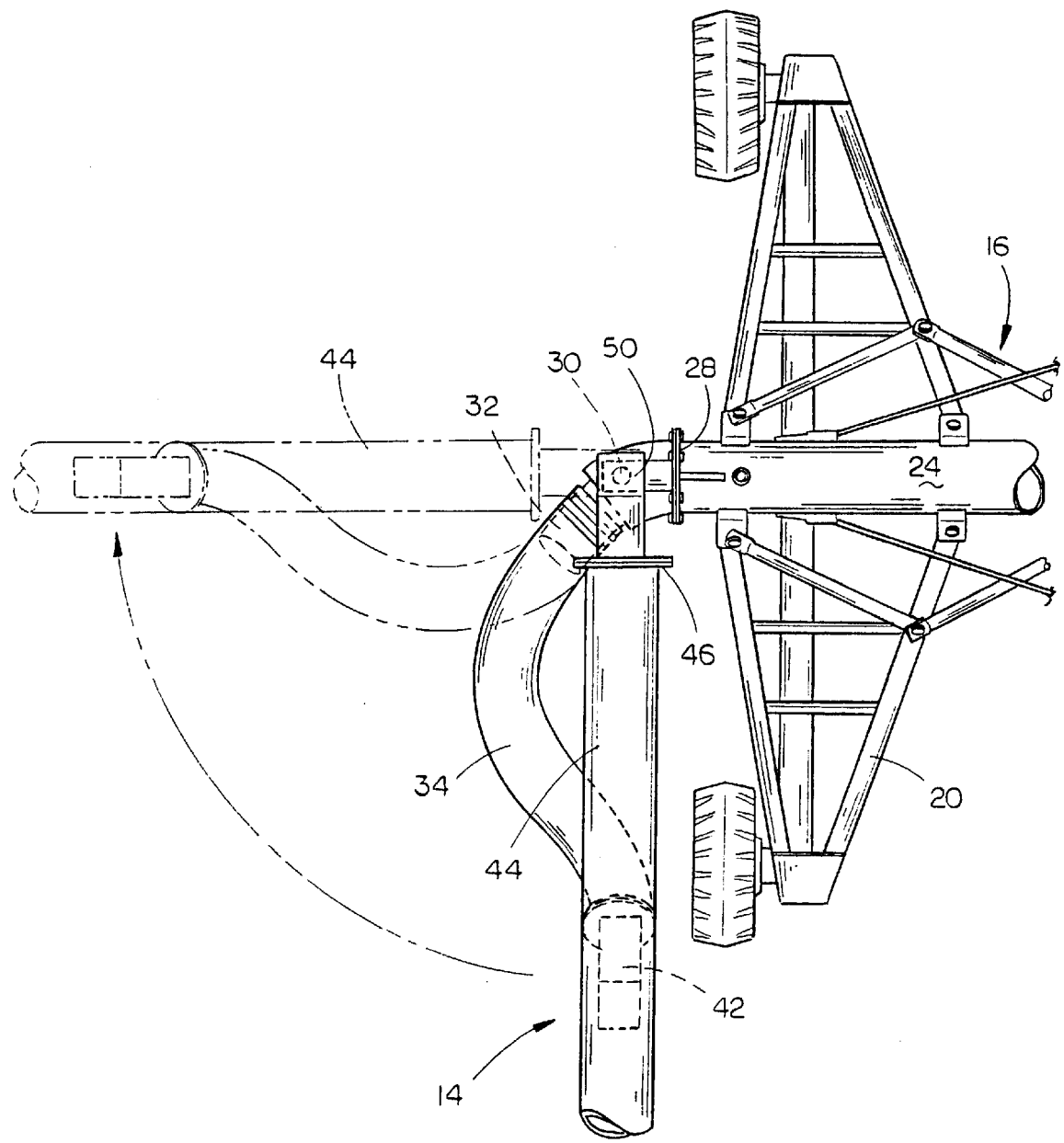
FIG. 3 is a top elevational view of the connection of FIG. 2 with the broken lines illustrating the corner arm water conduit in its completely extended position.
Figure 4:
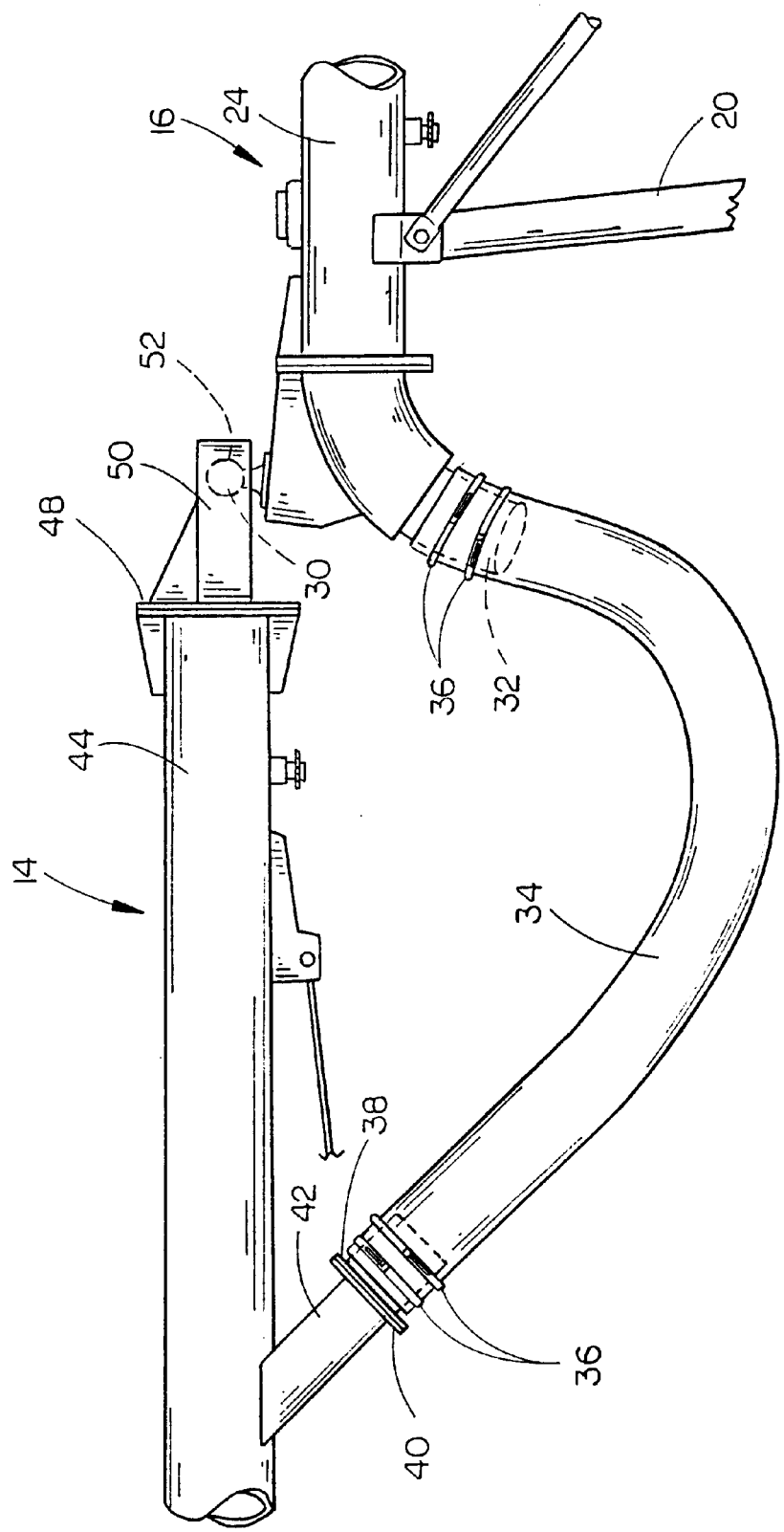
FIG. 4 is a side elevational view of the connection of FIG. 2.

Referring to FIG. 2, the numeral 24 refers to the outermost pipe section of the main boom 16. Support 26 is secured to the annular plate 28 mounted at the outer end of pipe section 24 and has a hitch ball 30 mounted thereon. Support 26 includes an arcuate pipe or elbow section 32 which extends downwardly, outwardly and rearwardly from the pipe section 24, as seen in FIG. 2. One end of connecting hose 34 is mounted on elbow 32 and is maintained thereon by conventional retainers 36. The other end of hose 34 has a flanged pipe 38 secured thereto which is adapted to be secured to the flange 40 which is mounted on the lower inner end of tubular member 42 which extends downwardly from the inner end of the water conduit 44 of corner arm 14. The inner end of water conduit or pipe 44 is provided with an annular flange 465 which is sealed by means of plate 48 having beam 50 extending therefrom. The underside of beam 50 is provided with a ball-shaped pocket 52 which is adapted to receive the hitch ball 30, as illustrated in FIG. 4.

Figure 5:
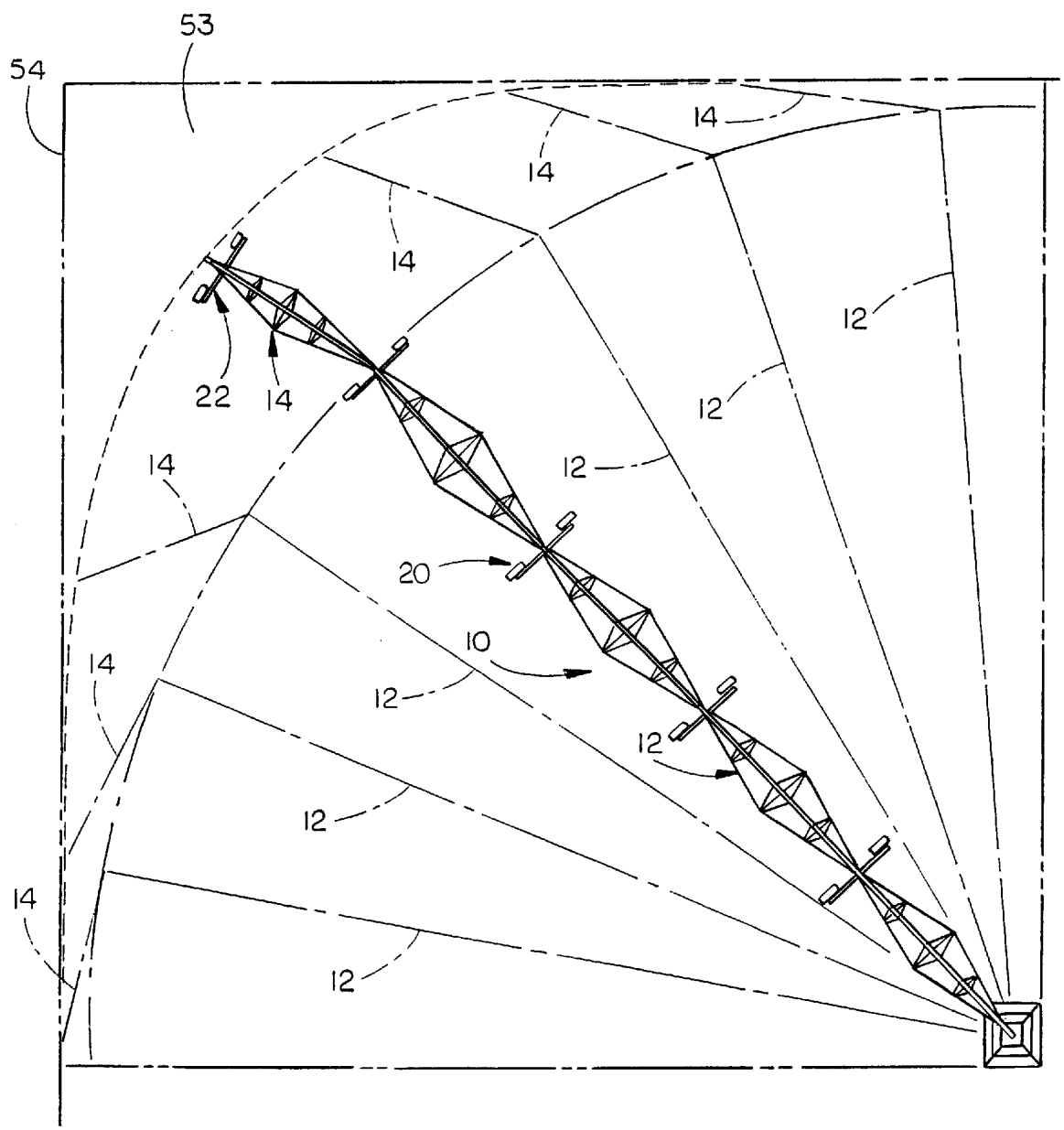
FIG. 5 is a plan view illustrating the corner arm irrigation system of this invention.
Figure 6:
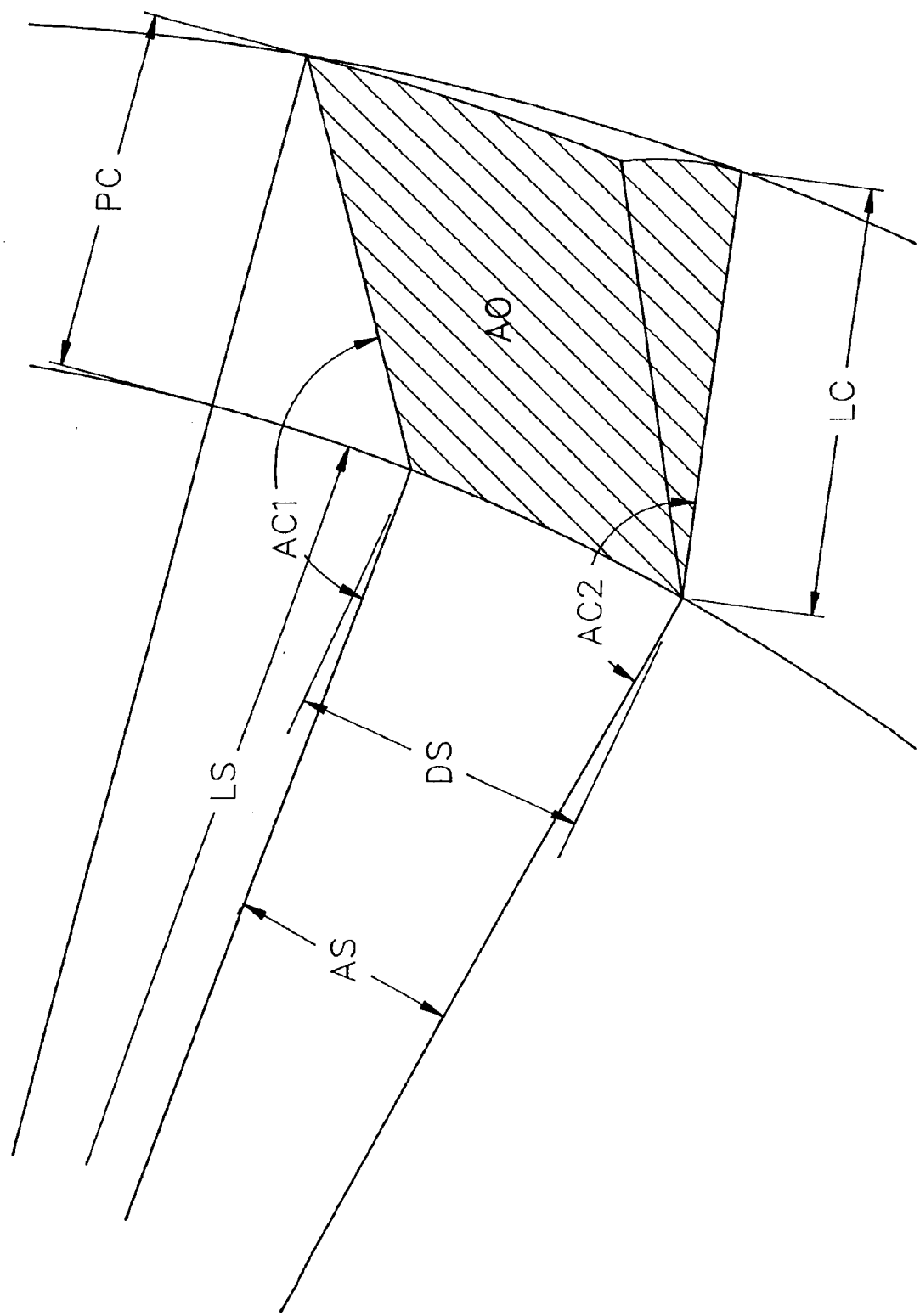
Figure 7:
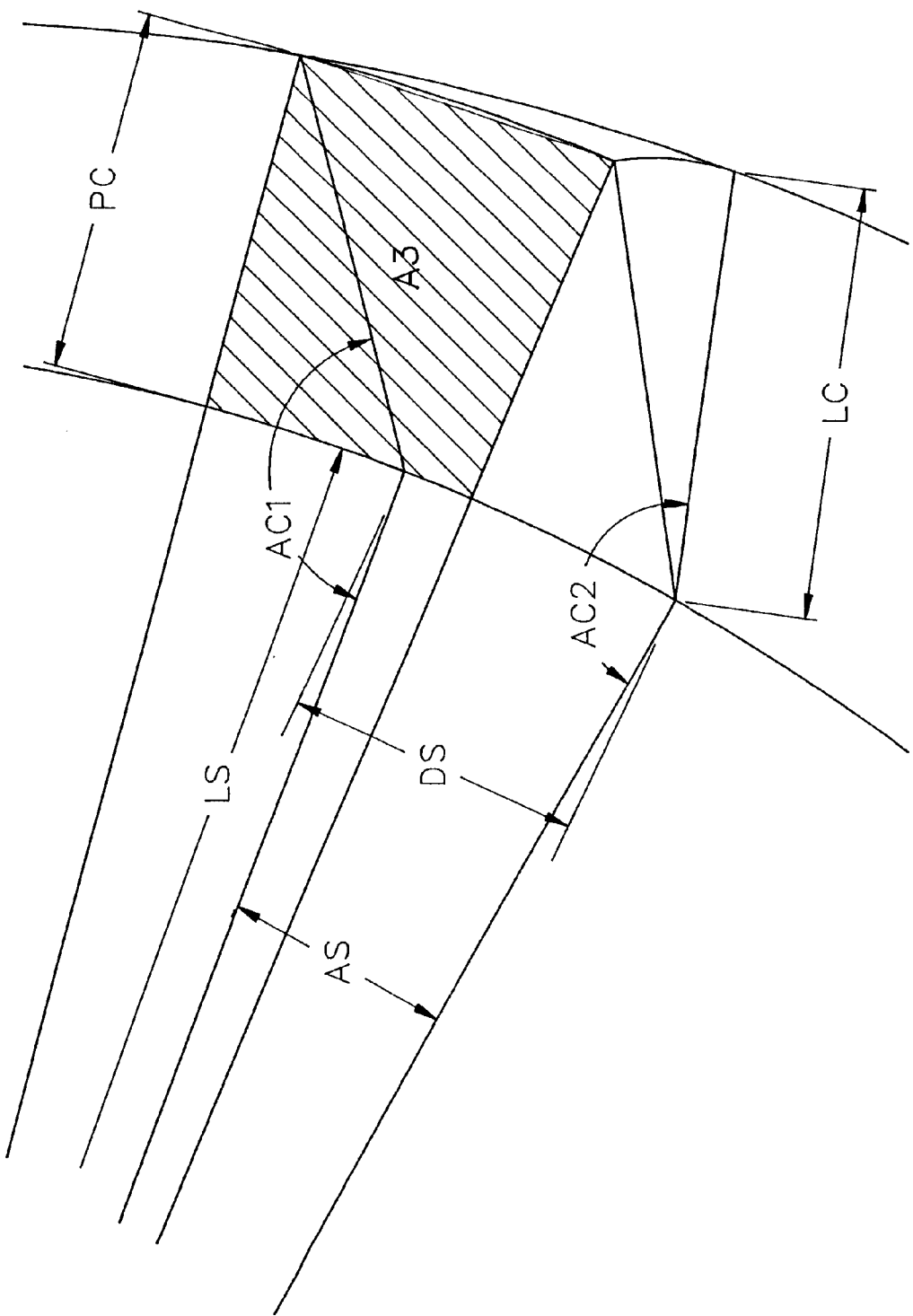
Figure 8:
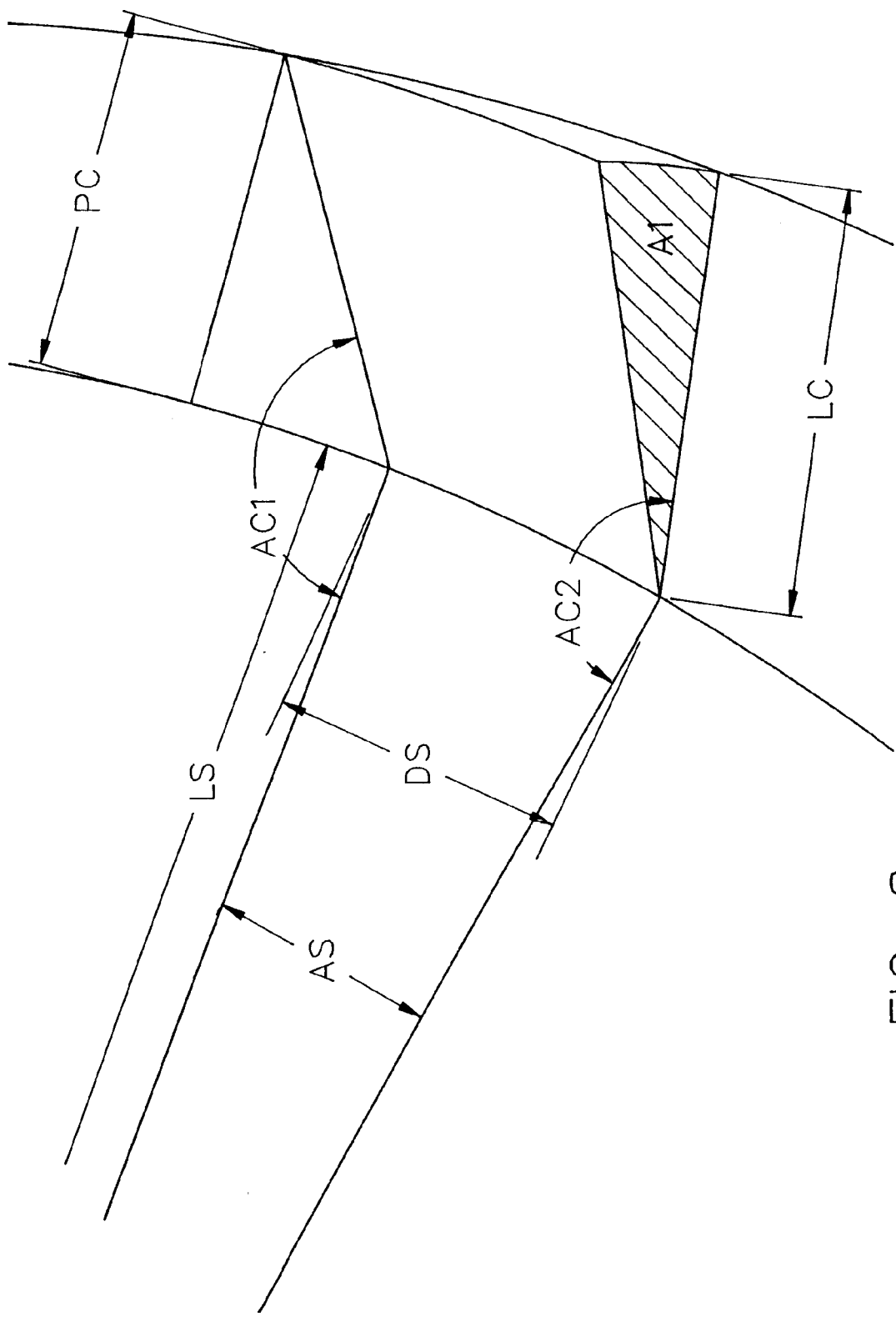
Figure 9:
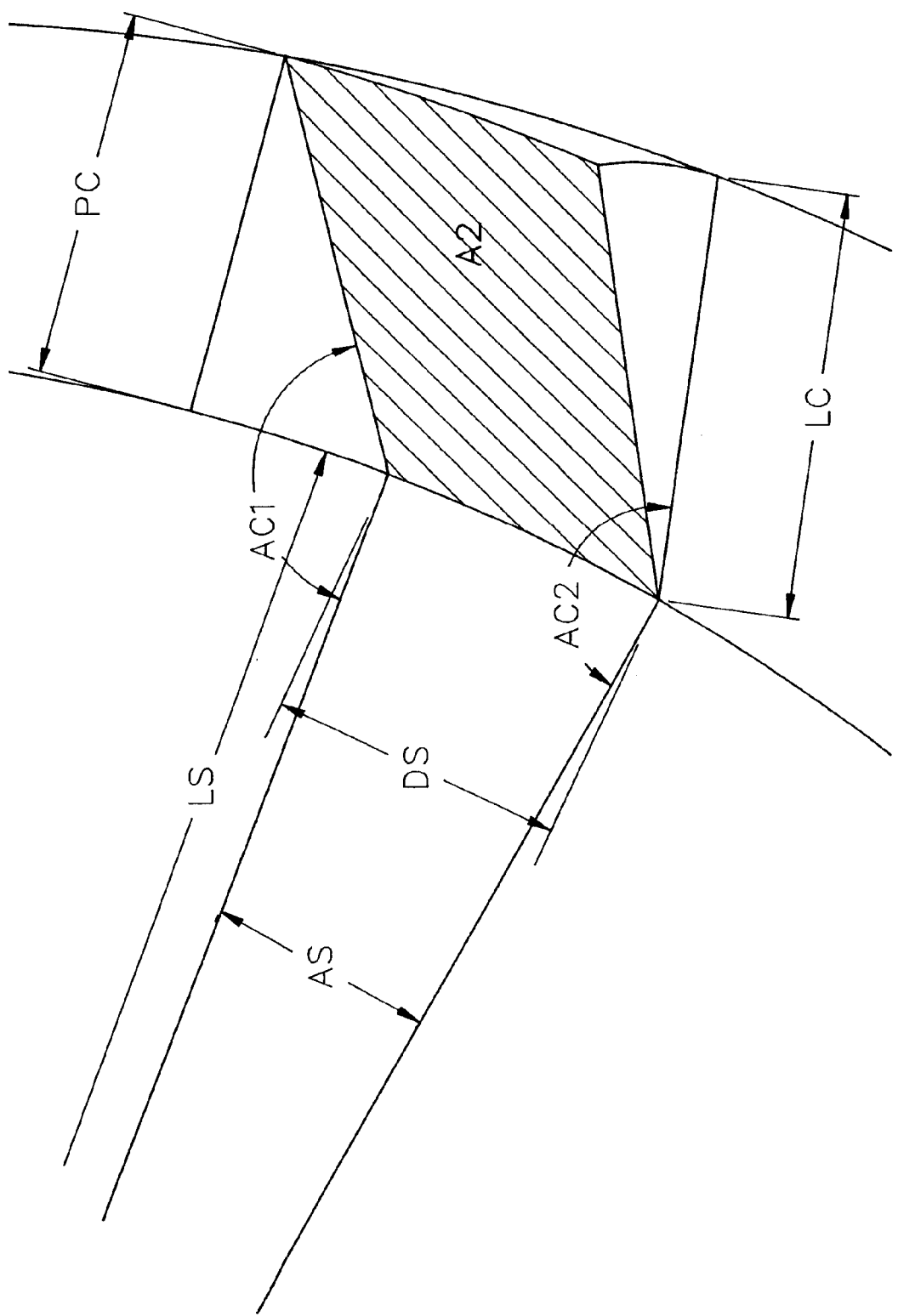
Figure 10:
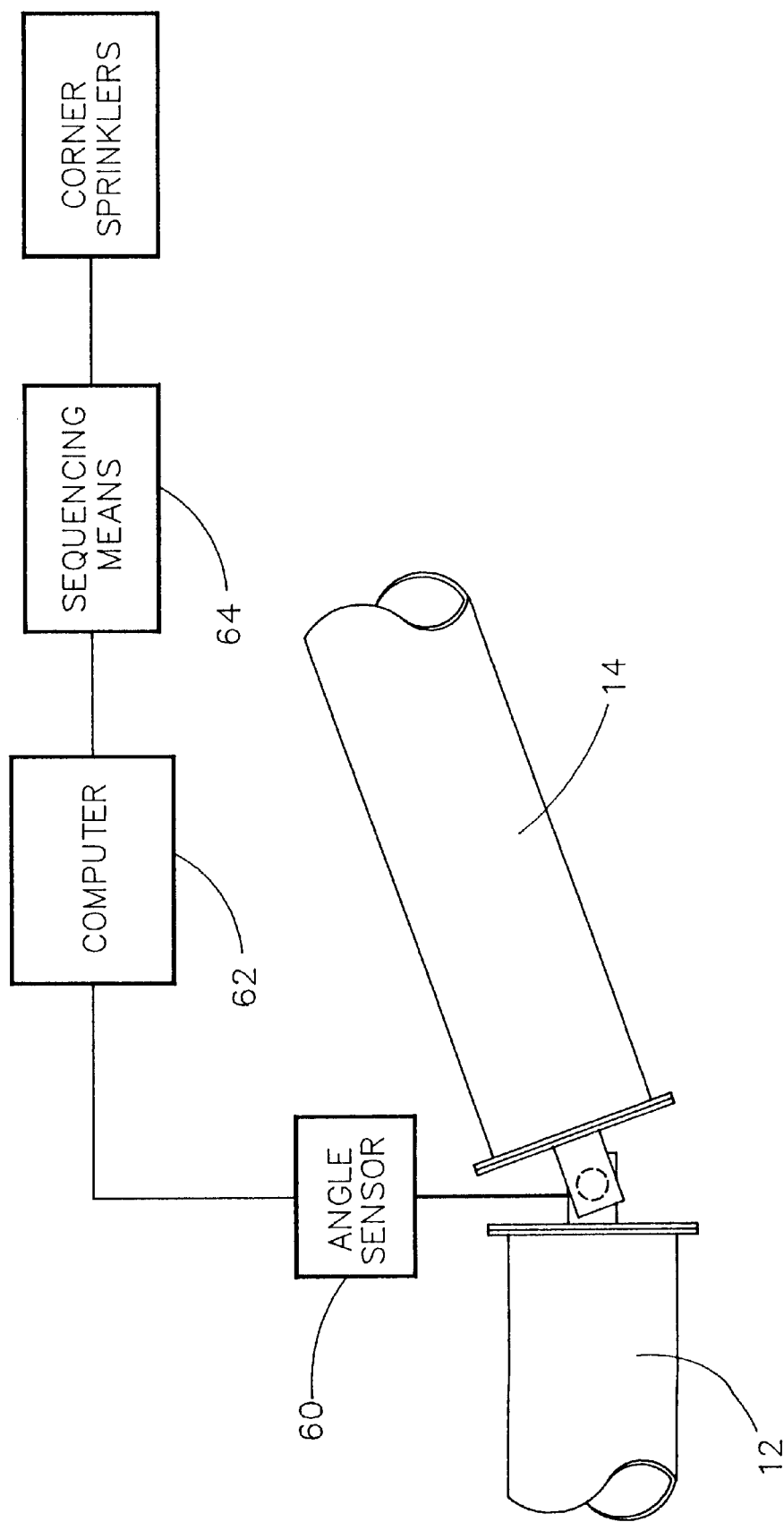
FIG. 10 is a block diagram illustrating the means for sensing the corner span angle, etc.

As illustrated in FIG. 5, the corner arm 14 trails the main arm and is moved out into the corners 53 of the field 54 so that the corners of the field may be irrigated in conventional fashion. Corner arm 14 includes an extension water pipe 44, as previously described, which has a plurality of spaced-apart sprinklers 56 positioned thereon. Each of the sprinklers 56 is preferably of the variable rate or pulsed rate type and is individually controlled by means of a combination hydraulic/solenoid valve 58, or similar control, provided thereon.

The numeral 60 refers to an angle sensor for sensing the angle between the main boom and extension boom. The corner span angle could also be determined by sensing the angular position of the steering wheels on the corner span drive tower. Further, the angle could be determined utilizing GPS technology. A computer 62 is provided and is programmed with a table of sprinkler sequences for the sprinklers on the corner span. Computer 62 is also programmed with the length of the corner span. Computer 62 calculates the area being covered by the corner span and then selects the best available sequence for the sprinklers on the corner span for all corner positions. Computer 62 controls the conventional sequencing means 64 which controls the operation of the corner sprinklers.

FIGS. 6 through 9 and the chart hereinbelow illustrate the manner in which the areas are calculated.

Definition of Symbols

LS System Length in feet
LC Corner Length in feet
AS System Angle in radians
DS System Distance in feet
AC1 Corner Angle 1 in radians
AS2 Corner Angle 2 in radians
PC Corner Projection in feet
A0 Total area covered by corner in square feet
A1 Area resulting from increasing or decreasing corner angle in square feet
A2 Area resulting from the corner projection moving with the system in square feet
A3 Area of ring segment in square feet Area Calculations $$A1 = [pi \times radius^2 \times included\ angle \times pi]/2$$
$$= [radius^2 \times included\ angle]/2$$
$$= LC^2(AC2 - AC1)/2$$

-continued $A2 = A3$ since triangular areas are equal
$\quad =$ area of system + corner projection segment −
$\quad\quad$ area of system segment
$\quad = (LS + PC)^2 \times AS/2 - LS^2 \times AS/2$
$\quad = AS \times [(LS^2 + \times LC \times PC + PC^2 - LS^2]/2$
$\quad = AS \times [PC \times (2 \times LS + PC]/2$
$A0 = A1 + A2$
$\quad = AS \times PC \times (2 \times LS + PC)/2 + LC^2 \times (AC2 - AC1)/2$ Other Relations $AS = DS/LS$ $PC = SQRT(LC^2 + LS^2 - 2 \times LC \times LS \times \cos AC1) - LS$ Thus, the computer is programmed with a table of sprinkler sequences for the sprinklers on the corner arm and is programmed with the length of the corner span. For any given position of the corner arm with respect to the main arm, as sensed by the conventional angle sensor, the computer 62 calculates the area being covered by the corner arm, selects the best available sprinkler sequences, and actuates the proper sprinkler sequence to ensure proper water distribution beneath the corner arm.

Thus it can be seen that the invention accomplishes at least all of its stated objectives.

We claim:

1. An irrigation system, comprising:

a center pivot support structure;

an elongated main water boom, having inner and outer ends, pivoted at its inner end to said center pivot support structure and extending outwardly therefrom;

said main water boom comprising an elongated main water pipe supported upon at least one non-steerable drive tower which propels said main water pipe around said center pivot support structure;

said main water pipe having a plurality of spaced-apart sprinklers mounted thereon;

an elongated extension boom, having inner and outer ends, pivotally connected at its said inner end to said outer end of said main boom;

said extension boom comprising an elongated extension water pipe having inner and outer ends supported upon at least one steerable drive tower;

steering means for steering said steerable drive tower;

guidance means for controlling said steering means so that said steerable drive tower is moved along a preselected path, as said main boom travels over the field to be irrigated, thereby causing said extension boom to pivotally move with respect to said boom to cause said extension boom to pivotally extend out into corner areas of the field and pivotally retract therefrom as said main boom travels through the field;

a plurality of sprinklers mounted on said extension water pipe along the length thereof in a spaced-apart relationship;

sequencing means for sequencing the sprinklers on said extension water pipe;

sensing means for sensing the angle of said extension boom with respect to said main boom;

a computer means including means for calculating the area being covered by said extension boom as said main boom and extension boom travel over the field to be irrigated;

said sensing means being operatively connected to said computer means for inputting the sensed angle thereinto;

said computer means controlling said sequencing means.

2. The irrigation system of claim 1 wherein said computer means is programmed with a table of sprinkler sequences.

3. The irrigation system of claim 1 wherein said computer means is programmed with the length of said extension boom.

4. The irrigation system of claim 1 wherein said computer means computes the area being covered by said extension boom by using the angle sensed by said sensing means, the length of said extension boom, and the change in the sensed angle.

* * * * *